United States Patent
Nesbitt et al.

(10) Patent No.: US 7,148,266 B2
(45) Date of Patent: Dec. 12, 2006

(54) GAME BALLS WITH COVER CONTAINING POST CROSSLINKABLE THERMOPLASTIC POLYURETHANE AND METHOD OF MAKING SAME

(75) Inventors: R. Dennis Nesbitt, Hernando, FL (US); Thomas J. Kennedy, III, Wilbraham, MA (US)

(73) Assignee: Callaway Golf Company, Carlsbad, CA (US)

( * ) Notice: Subject to any disclaimer, the term of this patent is extended or adjusted under 35 U.S.C. 154(b) by 238 days.

(21) Appl. No.: 10/935,010

(22) Filed: Sep. 7, 2004

(65) Prior Publication Data

US 2005/0054746 A1    Mar. 10, 2005

Related U.S. Application Data

(63) Continuation-in-part of application No. 10/119,398, filed on Apr. 9, 2002, now Pat. No. 6,787,582, which is a continuation of application No. 09/471,785, filed on Dec. 23, 1999, now Pat. No. 6,369,125.

(51) Int. Cl.
    *A63B 37/12*    (2006.01)
(52) U.S. Cl. ............ 522/145; 525/455; 473/354; 473/365; 473/378
(58) Field of Classification Search ............ None
    See application file for complete search history.

(56) References Cited

U.S. PATENT DOCUMENTS

| | | |
|---|---|---|
| 2,741,480 A | 4/1956 | Smith |
| 2,805,072 A | 9/1957 | Smith |
| 2,973,800 A | 3/1961 | Muccino |
| 3,034,791 A | 5/1962 | Gallagher |
| 3,053,539 A | 9/1962 | Piechowski |
| 3,130,102 A | 4/1964 | Watson et al. |
| 3,264,272 A | 8/1966 | Rees |
| 3,313,545 A | 4/1967 | Bartsch |
| 3,359,231 A | 12/1967 | Kent |
| 3,362,937 A | 1/1968 | Kent |
| 3,373,123 A | 3/1968 | Brice |
| 3,384,612 A | 5/1968 | Brandt et al. |
| 3,454,676 A | 7/1969 | Busse |
| 3,458,205 A | 7/1969 | Smith et al. |
| 3,502,338 A | 3/1970 | Cox |
| 3,534,965 A | 10/1970 | Harrison et al. |
| 3,572,721 A | 3/1971 | Harrison et al. |
| 3,883,145 A | 5/1975 | Cox et al. |
| 3,940,146 A | 2/1976 | Little |
| 3,974,238 A | 8/1976 | Schweiker et al. |
| 3,979,126 A | 9/1976 | Dusbiber |
| 3,989,568 A | 11/1976 | Isaac |
| 4,076,255 A | 2/1978 | Moore et al. |
| 4,078,014 A | 3/1978 | Starkweather |
| 4,085,937 A | 4/1978 | Schenk |
| 4,123,061 A | 10/1978 | Dusbiber |
| 4,185,831 A | 1/1980 | Tominaga |
| 4,187,358 A | 2/1980 | Kyo et al. |
| 4,234,184 A | 11/1980 | Deleens et al. |
| 4,248,432 A | 2/1981 | Hewitt et al. |
| 4,251,644 A | 2/1981 | Joffrion |
| 4,264,075 A | 4/1981 | Miller |
| 4,272,079 A | 6/1981 | Nakade et al. |
| 4,274,637 A | 6/1981 | Molitor |
| 4,295,652 A | 10/1981 | Saito et al. |
| 4,323,247 A | 4/1982 | Keches et al. |
| 4,337,946 A | 7/1982 | Saito et al. |
| 4,337,947 A | 7/1982 | Saito et al. |
| 4,347,338 A | 8/1982 | Torii et al. |
| 4,364,565 A | 12/1982 | Tomar |
| 4,398,000 A | 8/1983 | Kataoka et al. |
| 4,423,185 A | 12/1983 | Matsumoto et al. |
| 4,431,193 A | 2/1984 | Nesbitt |
| 4,570,937 A | 2/1986 | Yamada |
| 4,650,193 A | 3/1987 | Molitor et al. |
| 4,674,751 A | 6/1987 | Molitor et al. |
| 4,679,795 A | 7/1987 | Melvin et al. |
| 4,688,801 A | 8/1987 | Reiter |
| 4,690,981 A | 9/1987 | Statz |
| 4,714,253 A | 12/1987 | Nakahara et al. |
| 4,798,386 A | 1/1989 | Berard |
| 4,801,649 A | 1/1989 | Statz |
| 4,848,770 A | 7/1989 | Shama |
| 4,852,884 A | 8/1989 | Sullivan |
| 4,858,923 A | 8/1989 | Gobush et al. |
| 4,858,924 A | 8/1989 | Saito et al. |
| 4,884,814 A | 12/1989 | Sullivan |
| 4,911,451 A | 3/1990 | Sullivan et al. |
| 4,919,434 A | 4/1990 | Saito |
| 4,968,038 A | 11/1990 | Yamada |
| 4,979,746 A | 12/1990 | Gentiluomo |
| 4,984,804 A | 1/1991 | Yamada et al. |
| 4,986,545 A | 1/1991 | Sullivan |
| 5,002,281 A | 3/1991 | Nakahara et al. |
| 5,019,319 A | 5/1991 | Nakamura et al. |
| 5,026,067 A | 6/1991 | Gentiluomo |
| 5,048,838 A | 9/1991 | Chikaraishi et al. |
| 5,068,151 A | 11/1991 | Nakamura |

(Continued)

*Primary Examiner*—David J. Buttner
(74) *Attorney, Agent, or Firm*—Michael A. Catania; Elaine H. Lo

(57) ABSTRACT

A game ball having a cover formed from a crosslinkable thermoplastic polyurethane is disclosed. By selective exposure to radiation, the thermoplastic polyurethane cover is crosslinked and its hardness is increased. Typically, increases in hardness values of at least 2 units on the Shore D scale are realized upon exposure to 3.5 Mrads of gamma radiation.

7 Claims, 2 Drawing Sheets

U.S. PATENT DOCUMENTS

| | | |
|---|---|---|
| 5,072,944 A | 12/1991 | Nakahara et al. |
| 5,096,201 A | 3/1992 | Egashira et al. |
| 5,098,105 A | 3/1992 | Sullivan |
| 5,104,126 A | 4/1992 | Gentiluomo |
| 5,120,791 A | 6/1992 | Sullivan |
| 5,130,372 A | 7/1992 | Lences et al. |
| 5,150,905 A | 9/1992 | Yuki et al. |
| 5,155,157 A | 10/1992 | Statz et al. |
| 5,156,405 A | 10/1992 | Kitaoh et al. |
| 5,184,828 A | 2/1993 | Kim et al. |
| 5,187,013 A | 2/1993 | Sullivan |
| 5,210,138 A | 5/1993 | Yamamoto |
| 5,215,308 A | 6/1993 | Hiraoka et al. |
| 5,222,739 A | 6/1993 | Horiuchi et al. |
| 5,244,969 A | 9/1993 | Yamada |
| 5,252,652 A | 10/1993 | Egashira et al. |
| 5,253,871 A | 10/1993 | Viollaz |
| 5,273,286 A | 12/1993 | Sun |
| 5,273,287 A | 12/1993 | Molitor et al. |
| 5,274,041 A | 12/1993 | Yamada |
| 5,281,651 A | 1/1994 | Arjunan et al. |
| 5,304,608 A | 4/1994 | Yabuki et al. |
| 5,306,760 A | 4/1994 | Sullivan |
| 5,312,857 A | 5/1994 | Sullivan |
| 5,314,187 A | 5/1994 | Proudfit |
| 5,320,345 A | 6/1994 | Lai et al. |
| 5,324,783 A | 6/1994 | Sullivan |
| 5,330,837 A | 7/1994 | Sullivan |
| 5,338,610 A | 8/1994 | Sullivan |
| 5,348,804 A | 9/1994 | Vasselin et al. |
| 5,368,304 A | 11/1994 | Sullivan et al. |
| 5,387,750 A | 2/1995 | Chiang |
| 5,403,010 A | 4/1995 | Yabuki et al. |
| 5,427,377 A | 6/1995 | Maruoka |
| 5,439,227 A | 8/1995 | Egashira et al. |
| 5,480,155 A | 1/1996 | Molitor et al. |
| 5,482,285 A | 1/1996 | Yabuki et al. |
| 5,490,673 A | 2/1996 | Hiraoka |
| 5,490,674 A | 2/1996 | Hamada et al. |
| 5,492,972 A | 2/1996 | Stefani |
| 5,542,677 A | 8/1996 | Sullivan |
| 5,553,852 A | 9/1996 | Higuchi et al. |
| 5,556,098 A | 9/1996 | Higuchi et al. |
| 5,569,712 A | 10/1996 | Wang |
| 5,585,152 A | 12/1996 | Tamura et al. |
| 5,586,950 A | 12/1996 | Endo |
| 5,628,699 A | 5/1997 | Maruko et al. |
| 5,631,328 A | 5/1997 | Wang et al. |
| 5,674,137 A | 10/1997 | Maruko et al. |
| 5,683,312 A | 11/1997 | Boehm et al. |
| 5,713,801 A | 2/1998 | Aoyama |
| 5,713,802 A | 2/1998 | Moriyama et al. |
| 5,730,663 A | 3/1998 | Tanaka |
| 5,730,664 A | 3/1998 | Asakura et al. |
| 5,730,665 A | 3/1998 | Shimosaka et al. |
| 5,733,206 A | 3/1998 | Nesbitt et al. |
| 5,733,207 A | 3/1998 | Sullivan et al. |
| 5,759,676 A | 6/1998 | Cavallaro et al. |
| 5,779,561 A | 7/1998 | Sullivan et al. |
| 5,779,562 A | 7/1998 | Melvin et al. |
| 5,779,563 A | 7/1998 | Yamagishi et al. |
| 5,780,169 A | 7/1998 | Hiraoka et al. |
| 5,783,293 A | 7/1998 | Lammi |
| 5,792,008 A | 8/1998 | Kakiuchi et al. |
| 5,800,284 A | 9/1998 | Sullivan et al. |
| 5,803,831 A | 9/1998 | Sullivan et al. |
| 5,803,834 A | 9/1998 | Yamagishi et al. |
| 5,810,678 A | 9/1998 | Cavallaro et al. |
| 5,816,937 A | 10/1998 | Shimosaka et al. |
| 5,820,486 A | 10/1998 | Tanaka et al. |
| 5,820,488 A | 10/1998 | Sullivan et al. |
| 5,820,489 A | 10/1998 | Sullivan et al. |
| 5,827,167 A | 10/1998 | Dougan et al. |
| 5,830,087 A | 11/1998 | Sullivan et al. |
| 5,833,553 A | 11/1998 | Sullivan et al. |
| 5,833,554 A | 11/1998 | Sullivan et al. |
| 5,836,833 A | 11/1998 | Shimosaka et al. |
| 5,856,388 A | 1/1999 | Harris et al. |
| 5,857,925 A | 1/1999 | Sullivan |
| 5,863,264 A | 1/1999 | Yamagishi et al. |
| 5,869,578 A | 2/1999 | Rajagopalan |
| 5,873,796 A | 2/1999 | Cavallaro et al. |
| 5,885,172 A | 3/1999 | Herbert et al. |
| 5,886,103 A | 3/1999 | Bellinger |
| 5,889,114 A | 3/1999 | Statz |
| 5,891,973 A | 4/1999 | Sullivan et al. |
| 5,899,822 A | 5/1999 | Yamagishi et al. |
| 5,902,192 A | 5/1999 | Kashiwagi et al. |
| 5,902,855 A | 5/1999 | Sullivan |
| 5,908,358 A | 6/1999 | Wu |
| 5,919,100 A | 7/1999 | Boehm et al. |
| 5,919,862 A | 7/1999 | Rajagopalan |
| 5,922,252 A | 7/1999 | Stanton et al. |
| 5,929,189 A | 7/1999 | Ichikawa et al. |
| 5,935,021 A | 8/1999 | Kashiwagi et al. |
| 5,947,842 A | 9/1999 | Cavallaro et al. |
| 5,948,864 A | 9/1999 | Rajagopalan |
| 5,959,059 A | 9/1999 | Vedula et al. |
| 5,971,870 A | 10/1999 | Sullivan et al. |
| 5,976,035 A | 11/1999 | Umezawa et al. |
| 5,981,654 A | 11/1999 | Rajagopalan |
| 5,984,807 A | 11/1999 | Wai et al. |
| 5,998,506 A | 12/1999 | Nesbitt |
| 6,001,930 A | 12/1999 | Rajagopalan |
| 6,018,003 A | 1/2000 | Sullivan et al. |
| 6,054,550 A | 4/2000 | Umezawa et al. |
| 6,099,416 A * | 8/2000 | Sullivan et al. ............. 473/378 |
| 6,126,558 A | 10/2000 | Higuchi et al. |
| 6,142,888 A | 11/2000 | Higuchi et al. |
| 6,152,835 A | 11/2000 | Sullivan et al. |
| 6,152,836 A * | 11/2000 | Bradley et al. ............. 473/378 |
| 6,207,745 B1 | 3/2001 | Bersted |
| 6,228,940 B1 | 5/2001 | Sullivan |
| 6,355,715 B1 | 3/2002 | Ladd et al. |
| 6,369,125 B1 * | 4/2002 | Nesbitt ...................... 522/142 |
| 6,458,307 B1 | 10/2002 | Inoue et al. |
| 6,747,100 B1 | 6/2004 | Ichikawa et al. |
| 6,787,582 B1 * | 9/2004 | Nesbitt ...................... 522/135 |

* cited by examiner

GAME BALLS WITH COVER CONTAINING POST CROSSLINKABLE THERMOPLASTIC POLYURETHANE AND METHOD OF MAKING SAME

CROSS REFERENCE TO RELATED APPLICATIONS

This application is a continuation-in-part of U.S. application Ser. No. 10/119,398 filed Apr. 9, 2002, now U.S. Pat. No. 6,787,582 which is a continuation of U.S. application Ser. No. 09/471,785 filed Dec. 23, 1999, now U.S. Pat. No. 6,369,125.

FIELD OF THE INVENTION

The present invention generally relates to game balls, and more particularly to game balls having covers containing crosslinkable thermoplastic polyurethane. The ball preferably is a molded game ball such as a golf ball, basketball, baseball, softball, football, soccer ball, volleyball, tennis ball, lacrosse ball or the like.

BACKGROUND OF THE INVENTION

There are generally, three types of golf balls. The first type is a wound ball wherein a vulcanized rubber thread is wound under tension around a solid or semi-solid core, and thereafter is enclosed in a single or multi-layer covering of tough, protective material.

A second type of golf ball is a one-piece ball formed from a solid mass of moldable resilient material which has been cured to develop the necessary degree of hardness. One-piece molded balls do not have an enclosing cover. A third type of ball is a multi-piece (two or more pieces) non-wound ball which includes a solid or liquid core of one or more layers and a cover having one or more layers formed over the core.

Multi-piece non-wound golf balls typically have a cover which contains a substantial quantity of ionomer. Useful ionomers include those sold by E.I. Dupont de Nemours and Company under the name Surlyn® as well as those sold by Exxon under the name Iotek®. Ionomers impart toughness and cut resistance to the covers. It would be useful to develop golf ball covers which contain substantial quantities of non-ionomeric materials and which have the durability, scuff resistance, cut resistance and other playability properties of ionomeric golf ball covers.

Polyurethanes are polymers which are used to form a broad range of products. They are generally formed by mixing two primary ingredients during processing. For the most commonly used polyurethanes, the two primary ingredients are a polyisocyanate (for example, diphenylmethane diisocyanate monomer ("MDI") and toluene diisocyanate ("TDI") and their derivatives) and a polyol (for example, a polyester polyol or a polyether polyol).

A wide range of combinations of polyisocyanates and polyols, as well as other ingredients, are available. Furthermore, the end-use properties of polyurethanes can be controlled by the type of polyurethane utilized, i.e., whether the material is thermoset (crosslinked molecular structure) or thermoplastic (linear molecular structure).

Crosslinking occurs between the isocyanate groups (—NCO) and the polyol's hydroxyl end-groups (—OH). Additionally, the end-use characteristics of polyurethanes can also be controlled by different types of reactive chemicals and processing parameters. For example, catalysts are utilized to control polymerization rates. Depending upon the processing method, reaction rates can be very quick (as in the case for some reaction injection molding systems—"RIM") or may be on the order of several hours or longer (as in several coating systems). Consequently, a great variety of polyurethanes are suitable for different end-uses.

Polyurethane has been used for golf balls and other game balls as a cover material. Commercially available polyurethane golf balls have been made of thermoset polyurethanes. A polyurethane becomes irreversibly "set" when a polyurethane prepolymer is crosslinked with a polyfunctional curing agent, such as polyamine and polyol. An isocyanate that is reacted with a polyamine forms a polyurea. The term "polyurethane" is often used to describe polyurethane/polyurea systems. The prepolymer typically is made from polyether or polyester. Diisocyanate polyethers are preferred because of their water resistance.

The physical properties of thermoset polyurethanes are controlled substantially by the degree of crosslinking. Tightly crosslinked polyurethanes are fairly rigid and strong. A lower amount of crosslinking results in materials that are flexible and resilient. Thermoplastic polyurethanes have some crosslinking, but purely by physical means. The crosslinking bonds can be reversibly broken by increasing temperature, as occurs during molding or extrusion. In this regard, thermoplastic polyurethanes can be injection molded, and extruded as sheet and blown film. They can be used to up to about 350° F. and are available in a wide range of hardnesses.

U.S. Pat. No. 5,006,297 indicates that while thermoplastic and thermosetting polyurethanes are known, thermosets have been found to produce better cover stocks for golf balls. Additionally, while thermoplastic polyurethanes can be used to form game balls, they lack the scuff and cut resistance of a crosslinked polyurethane. Similarly, thermoplastic polyurethanes do not readily crosslink.

A further disadvantage of using thermosetting polyurethanes to form game ball covers is that scrap material (i.e. sprues, runners and/or reject parts) and cover stock from off-spec balls cannot be reused without substantial processing. It would be useful to develop a high quality game ball utilizing a polyurethane cover material which is subject to thermal degradation prior to final processing. In such a case, the scraps formed in the cover molding stage could be conveniently re-used to form additional game ball covers. A further advantage would be to produce a polyurethane based game ball which, when molded and then crosslinked, is resistant to thermal degradation. This would produce an improved game ball which could also withstand prolonged exposure to heat during use or storage.

SUMMARY OF THE INVENTION

The present invention relates to new and improved game balls which overcome the above-referenced problems and others. An object of the invention is to form a durable, scuff resistant game ball. The invention includes unitary, wound, two-piece, three-piece and multi-layer golf balls, but is not limited solely to golf balls.

Another object of the invention is to provide a game ball cover in which scrap cover material can be readily reused prior to final processing.

Yet another object of the invention is to provide a golf ball having a scuff resistant polyurethane cover which is also resistant to heat elongation at high temperatures.

Yet another object of the invention is to provide an improved method for making a thermoplastic polyurethane covered game ball.

Yet another object of the invention is to provide a method for making a scuff resistant and cut resistant polyurethane game ball.

Another object of the invention is to provide a method of making a polyurethane covered golf ball having high heat resistance.

An additional object is to produce a thermoplastic polyurethane game ball which is readily crosslinked via high energy electrons or gamma rays. Such a thermoplastic polyurethane would be easily processable and could be directly molded into or around a core to form a game ball. Alternatively, the thermoplastic polyurethane could be injection molded into half shells that could be compression molded around a core or a mantle to form a multi-piece game ball. The runners and scraps from the molding process would not be crosslinked and could then be recycled with the virgin cover material. After molding, the game ball could then be subjected to electron beam or gamma irradiation.

Other objects will be pointed out more particularly in detail hereafter.

The present invention addresses and remedies all of the foregoing objectives. In a first aspect, the present invention provides a game ball comprising a central portion and a first cover layer formed over the central portion. The first cover layer is formed from a particular type of crosslinkable thermoplastic polyurethane.

In another aspect, the present invention provides a core and a cover layer disposed about the core. The cover layer comprises a thermoplastic polyurethane that is capable of undergoing crosslinking upon exposure to about 3.5 Mrads of radiation, thereby causing an increase in the hardness of the cover by at least 2 units on the Shore D hardness scale.

In yet another aspect, the present invention provides a method of forming a game ball comprising providing a game ball center and then forming a cover layer over the game ball center. The cover layer includes a crosslinkable thermoplastic polyurethane.

In a further aspect, the present invention provides a method of making a golf ball comprising providing a core of a particular composition, forming a cover layer about the core, and then irradiating the cover layer under conditions sufficient to increase the Shore D hardness of the cover layer by at least 3 units. The cover layer comprises a resin composition that includes at least 95 parts by weight of a crosslinkable thermoplastic polyurethane and has a hardness prior to crosslinking, of 35 to about 72 on the Shore D hardness range.

BRIEF DESCRIPTION OF THE DRAWINGS

The following is a brief description of the drawings which are presented for the purposes of illustrating the invention and not for the purposes of limiting the same.

DETAILED DESCRIPTION OF THE PREFERRED EMBODIMENTS

Figure 1:
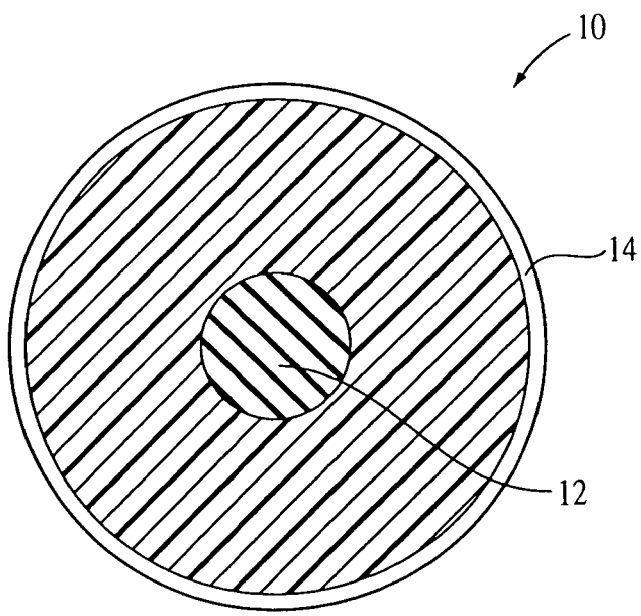
FIG. 1 is a schematic cross sectional view of a golf ball according to the first preferred embodiment of the present invention.

The present invention in a preferred form is a game ball comprising a central portion, and an optional first cover layer surrounding the central portion. The first cover layer comprises a first resin composition which includes at least about 95%, and preferably at least 98%, by weight of a crosslinkable thermoplastic polyurethane. The game ball preferably is a molded ball, but also includes balls with stitched covers. The ball preferably is a golf ball, basketball, baseball, softball, football, soccer ball, volleyball, tennis ball or lacrosse ball. More preferably, the ball is a golf ball, softball, or baseball. Other types of game balls are contemplated.

The crosslinkable thermoplastic polyurethane is preferably of a type which has a Shore D hardness (ASTM D-2240) of about 35 to about 72 before crosslinking and undergoes an increase in Shore D hardness of at least 2 units, and preferably at least 3 units, upon exposure to gamma radiation at a dosage of about 3.5 Mrads. More preferably, the thermoplastic polyurethane is of a type which experiences an increase in Shore D hardness of at least 5 units upon exposure to gamma radiation at a dosage of 3.5 Mrads. Hardnesses can be increased, such as by 7 or more units upon exposure to greater dosages of radiation.

In one embodiment of the invention, the cover layer comprises a blend of crosslinkable thermoplastic polyurethane and at least one member selected from the group consisting of high acid ionomers, low acid ionomers, various non-ionomeric thermoplastics including polyurethanes, and polar-modified metallocene catalyzed polyolefins, polyvinyl chloride, acrylonitrile butadiene styrene, polycarbonate, and combinations thereof. The cover layer of the game ball preferably has an irradiation cross-linked outer surface.

The high acid ionomers which may be suitable for use in formulating the inner cover layer compositions are ionic copolymers which are the metal, i.e. sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e. iso- or n-butylacrylate, etc.) can also be included to produce a softer terpolymer. The carboxylic acid groups of the copolymer are partially neutralized (i.e. approximately 10–100%, preferably 30–70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, and more preferably from about 18.5% to about 21.5% by weight of a carboxylic acid.

The low acid ionomers which may be suitable for use in formulating the inner layer compositions are ionic copolymers which are the metal, i.e. sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e. iso- or n-butylacrylate, etc.) can also be included to produce a softer terpolymer. The carboxylic acid groups of the copolymer are partially neutralized (i.e. approximately 10–100%, preferably 30–70%) by the metal ions. Each of the low acid ionomer resins which may be included in the inner layer cover compositions of the invention contains 16% by weight or less of a carboxylic acid.

Moreover, in alternative embodiments, the outer cover layer formulation may also comprise up to 100 wt % of a soft, low modulus non-ionomeric thermoplastic material including a polyester polyurethane such as B.F. Goodrich Company's Estane® polyester polyurethane X-4517. The non-ionomeric thermoplastic material may be blended with a soft ionomer. For example, polyamides blend well with soft ionomer. Other soft, relatively low modulus non-ionomeric thermoplastic materials may also be utilized to produce the outer cover layer as long as the non-ionomeric thermoplastic materials produce the playability and durability characteristics desired without adversely affecting the enhanced travel distance characteristic produced by the high acid ionomer resin composition. These include, but are not limited to thermoplastic polyurethanes such as Texin™ thermoplastic polyurethanes from Mobay Chemical Co. and the Pellethane™ thermoplastic polyurethanes from Dow Chemical Co.; non-ionomeric thermoset polyurethanes including but not limited to those disclosed in U.S. Pat. No. 5,334,673; cross-linked metallocene catalyzed polyolefins; ionomer/rubber blends such as those in Spalding U.S. Pat. Nos. 4,986,545; 5,098,105 and 5,187,013; and, Hytrel™ polyester elastomers from DuPont and Pebax™ polyether amides from Elf Atochem S.A. The disclosures of these noted patents are incorporated herein by reference.

The thermoplastic polyurethane utilized in a cover layer in accordance with the present invention preferably comprises at least one of a polyether-based polyurethane and a polyester-based polyurethane. In this embodiment, the cover layer after crosslinking has a Shore D hardness in the range of about 37 to about 74, preferably from about 38 to about 75, and most preferably from about 40 to about 77. When the thermoplastic polyurethane is crosslinked by irradiation, the difference between the Shore D hardness of the cover layer before and after irradiation is at least 2 units, and preferably at least 3 units.

When the game ball of the present invention is a golf ball, the central portion preferably is at least one member selected from the group consisting of solid cores, wound cores, liquid filled cores, and gel filled cores.

Another preferred form of the present invention is a game ball having two or more cover layers. The second cover layer can be beneath or surrounding the first cover layer. The second cover layer can be formed from the same or different material than the first cover layer. In one preferred form of the invention, the second cover layer comprises ionomer.

Another preferred form of the present invention is a method of forming a game ball, comprising obtaining a game ball center, and forming a first cover layer over the center, the first cover layer comprising a first resin composition which includes at least 95%, and preferably at least 98%, by weight of a crosslinkable thermoplastic polyurethane. In another preferred embodiment of the invention, the method further comprises the step of crosslinking the thermoplastic polyurethane after the first cover layer has been formed over the core.

Yet another preferred form of the invention is a method of making a golf ball, comprising (a) obtaining a core, (b) forming a first cover layer over the core, the first cover layer having a first Shore D hardness value in the range of 35 to 72 and being formed from a first resin composition which includes at least 95%, and preferably at least 98%, by weight of a crosslinkable thermoplastic polyurethane based upon the weight of the first resin composition, and (c) irradiating the first cover layer under conditions sufficient to increase the Shore D hardness of the first cover layer by at least 2 points. The method may optionally further comprise the step of (d) forming a second cover layer over or beneath the first cover layer. When the second cover layer surrounds the first cover layer, the first cover layer can be irradiated prior to application of the second cover layer.

In a particularly preferred form of the present invention, the polyurethane cover layer is initially uncrosslinked. In another form of the invention, the cover is subjected to light waves, such as gamma irradiation, or is contacted by high energy electrons to effect crosslinking as desired.

When the game ball of the invention is a golf ball, it preferably has a coefficient of restitution of at least 0.750, more preferably at least 0.760, and most preferably at least 0.770. The thickness of the golf ball cover preferably is in the range of from about 0.020 inches to about 0.100 inches, and more preferably from about 0.020 inches to about 0.050 inches.

The present invention game ball exhibits a wide array of very desirable physical properties. When the game ball of the present invention is a golf ball, it preferably exhibits a scuff resistance of 3 or better. The golf ball of the invention preferably has a cut resistance of 3 or better. Additional details of these properties and associated tests are set forth below.

PGA compression is an important property involved in the performance of a golf ball. The compression of the ball can affect the playability of the ball on striking and the sound or "click" produced. Similarly, compression can affect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates.

The term "compression" as utilized in the golf ball trade generally defines the overall deflection that a golf ball undergoes when subjected to a compressive load. For example, PGA compression indicates the amount of change in a golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multilayer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70 to 110, and preferably around 80 to 100.

In determining PGA compression using the 0–200 scale, a standard force is applied to the external surface of the ball. A ball which exhibits no deflection (0.0 inches in deflection) is rated 200 and a ball which deflects 0.2 of an inch is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Philadelphia, Pa. to evaluate compression of the various components (i.e., cores, mantle cover balls, finished balls, etc.) of the golf balls. The Riehle compression device determines deformation in thousandths of an inch under a fixed initialized load of 200 pounds. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160–Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is known. These devices have been designed, such as a Whitney Tester, to correlate or correspond to PGA compression through a set relationship or formula.

The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125±5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

A scuff test was used to evaluate golf balls of the present invention. This test is performed as follows. A Miyamae driving machine was used. Concerning the club, a Maltby Logic Pro Tour sand wedge, with box (square) grooves cut to 0.025 inches wide (no post sandblasting—"worst case" groove type) was used. A sandblasted version of this club was also tried along with several other Top-Flite® wedges but they did not scuff the balls as much as desired. A clubhead speed of 58 mph was used. Each ball was hit three times, alternating ball types after every hit. The clubface was brushed clean after each hit to ensure consistent groove contact. The balls were subjectively ranked from 1 to 6, 1 being the best, 6 the worst. A one rank difference is significantly different; 2 rankings apart would be highly significantly different.

Shore D hardness of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

Cut resistance was measured in accordance with the following procedure. A golf ball was fired at 135 feet per second against the leading edge of a pitching wedge wherein the leading edge radius is 1/32 inch, the loft angle is 51 degrees, the sole radius is 2.5 inches and the bounce angle is 7 degrees.

The cut resistance of the balls tested herein was evaluated on a scale of 1 to 5. The number 1 represents a cut that extends completely through the cover to the core. A 2 represents a cut that does not extend completely through the cover but that does break the surface. A 3 does not break the surface of the cover but leaves a permanent dent. A 4 leaves only a slight crease which is permanent but not as severe as 3. A 5 represents virtually no visible indentation of damage of any sort.

As used herein, the term "crosslinkable thermoplastic polyurethane" is a thermoplastic polyurethane which is moldable as a thermoplastic material and can be readily crosslinked by irradiation, or by peroxide curing or other suitable technique. As shown below in comparative Example 1, conventional thermoplastic polyurethanes (TPU) do not readily crosslink. TPU's have fairly good heat resistance but crosslinking the TPU greatly increases the melting or softening point. Softening point increases with radiation and amount of a reactive co-agent, described in greater detail herein.

Ionomer covered golf balls have the poorest heat resistance or melting problems. Some golf balls are gamma radiated to improve heat resistance. "Melted" golf balls are a problem when golf balls are left in closed cars during hot weather especially in hatch-backs where the temperature can exceed 200° F. As described herein, golf balls subjected to a minimum temperature of 170° F. for 1 hour should show no visible signs of melting or dimple distortion. As will be appreciated, melting or dimple distortion can significantly and detrimentally affect golf ball flight performance. Obviously, resistance to higher temperatures is desired.

Polyurethanes typically are formed by reacting a polyol with a polyisocyanate. In some cases, the polyisocyanate is in the form of a polyurethane prepolymer formed from a polyether or polyester and a polyisocyanate. The polyol or polyamine is typically referred to as a "curing" agent. Examples of reactants used to form polyurethanes by this technique are discussed in U.S. Pat. No. 5,006,297, herein incorporated by reference. In other cases a polyester or acrylic polyol is reacted with a polyisocyanate.

Two types of polyisocyanates are predominantly used to make polyurethanes, diphenylmethane diisocyanate monomer (MDI) and its derivatives, and toluene diisocyanate (TDI) and its derivatives.

MDI is the most widely used polyisocyanate. Both rigid and flexible foams, reaction injection moldings, elastomers, coatings, and casting compounds are made from MDI. There are three basic grades of MDI, polymeric MDI, pure MDI, and pure MDI derivatives.

Polymeric MDI is used in both cellular and non-cellular products. However, because of the high thermal insulation properties possible with polymeric MDI, its main use is in closed-cell, rigid foam insulation for the construction and refrigeration industries. Other uses are high-resilience (HR) flexible foam, carpet backing, and binders.

Pure MDI, which is produced from polymeric MDI, is a low-melting-temperature (about 100° F.) solid. Its primary use is in thermoplastic and cast elastomers. It also is used as an additive for synthetic fibers to achieve high fiber tenacity and elongation.

Pure MDI derivatives are tailored to provide specific processing and reaction characteristics. A major use for these solvent-free liquids is in reaction injection molding (RIM), but they also find application in integral skin moldings, semi-flexible moldings, and cast elastomers.

Toluene diisocyanate, TDI, is used almost exclusively to make flexible foam. TDI, however, also finds some use in elastomers, sealants, and coatings. TDI's generally are water-white liquids which have much higher isocyanate (—NCO) contents than any MDI, but lower molecular weights.

MDI and TDI also are blended, particularly for producing flexible molded foams. The free-flowing, brown liquid blends have nearly as high isocyanate contents as TDI.

Two basic types of polyols are used in polyurethanes systems: polyesters and polyethers. Polyethers are the most widely used.

Often in referring to polyols, their functionality is specified. The functionality pertains to the number of reactive sites, which in turn, controls crosslinking. The more crosslinked (higher functionality), the more rigid will be the polyurethane. Functionality is controlled by the initiator used to manufacture the polyol. Glycerine, for example, is commonly used to initiate triol (3 functional) polyols. To this initiator is added an oxide such as propylene oxide, ethylene oxide, or a combination, to extend the molecular chain and tailor final processing and performance characteristics of the polyol. Triols typically are used to produce flexible foams; diols are used for elastomers, coatings, and sealants; and tetrols typically are used for rigid foams.

Polyether-based polyols have greater resistance to hydrolysis. Polyether polyols can be modified by the in-situ polymerization of acrylonitrile/styrene monomers. The resulting graft polyols generally produce flexible foams with improved load-bearing properties as well as greater tensile and tear strengths. Depending on the backbone on which these vinyl monomers are grafted, a wide range of performance characteristics can be developed.

Polyester polyols yield polyurethanes with greater strength properties, wear resistance, and thermal stability than polyether polyurethanes, and they can absorb more energy. These materials, however, are generally more expensive than polyethers.

Polyester polyols are typically classed by molecular weight. Low molecular weight polyols (less than 1500) are used in coatings, casting compounds, and rigid foams. Medium molecular weight polyols (1550 to 2500) are used in elastomers. And, high molecular weight polyols (greater than 2500) are used in flexible foams.

Thermoset polyurethanes are typically crosslinked and cannot be repeatedly thermoformed. On the other hand, thermoplastic polyurethanes are similar to other thermoplastics in that they can be repeatedly plasticized by the influence of temperature and pressure.

The crosslinkable thermoplastic polyurethane used to form a game ball according to the present invention is initially a thermoplastic, and in this state can be melted and solidified repeatedly. However, the material can be readily crosslinked, thereby increasing its hardness and providing that it cannot be reversibly melted without thermal degradation.

A wide array of crosslinkable thermoplastic polyurethanes can be used in the present invention. For example, EBXL-TPU is a thermoplastic polyurethane recently made available from Zylon Polymers™, 23 Mountain Avenue, Monsey, N.Y. 10952. EBXL-TPU is a pelletized, medical grade, polyether or polyester based thermoplastic polyurethane, reactor modified to allow crosslinking by ionizing radiation. It is a low melt index material suitable for extrusion into profiles, film and sheet, or injection molding. Once crosslinked, the material combines the ease of processing and toughness of TPU with the improved resistance to water, solvents and elevated temperatures characteristic of thermoset materials. Table 1 below, sets forth details of this preferred material.

TABLE 1

EBXL - TPU
Typical Physical Properties

| PROPERTY | VALUE | UNITS |
| --- | --- | --- |
| Radiation | 12.5–15 | MegaRads |
| Shore Hardness | 80 | Shore A |
| Specific Gravity | 1.04 | gr/cc |
| Tensile Strength | 5000 | psi |
| Ultimate Elongation | 425 | % |
| Compression set, 70 hrs @ 100 deg C. | 50 | % |
| Melt Flow Index | 2 | gms/10 min |
| FLUID RESISTANCES | | |
| Water, 24 hrs @ 23 C. | no effect | |
| Isopropyl Alcohol, 100% 24 hrs @ 23 C. | no effect | |
| Tetrahydrofuran, 24 hrs @ 23 C. | swells, does not dissolve | |

A further preferred class of crosslinkable thermoplastic polyurethanes is a commercially available polyurethane from BASF, designated as Elastollan™. Properties of several specific formulations of Elastollan™ polyurethanes are set forth in Table 2 below.

TABLE 2

| Physical properties[1] | Units | ASTM Method | 1175AW[3] | 1180A | 1185A | 1190A | 1195A | 1154D | 1160D | 1164D | 1174D |
| --- | --- | --- | --- | --- | --- | --- | --- | --- | --- | --- | --- |
| Specific gravity | gr/cc | D-792 | 1.14 | 1.11 | 1.12 | 1.13 | 1.14 | 1.16 | 1.17 | 1.18 | 1.19 |
| Hardness | Shore A | D-224 | 76 ± 2 | 80 ± 2 | 86 ± 2 | 91 ± 2 | 95 ± 2 | — | — | — | — |
|  | D |  | — | — | — | 42 ± 2 | 47 ± 2 | 53 ± 2 | 60 ± 2 | 64 ± 2 | 73 ± 2 |
| Tensile strength | MPa | D-412 | 30 | 32 | 33 | 37 | 36 | 40 | 40 | 41 | 45 |
|  | psi |  | 4500 | 4700 | 4800 | 5300 | 5200 | 5800 | 5800 | 6000 | 6500 |
| Tensile stress @100% elongation | MPa | D-412 | 4.3 | 5.5 | 7.6 | 10 | 12 | 20 | 22 | 25 | 32 |
|  | psi |  | 620 | 800 | 1100 | 1500 | 1750 | 2900 | 3200 | 3600 | 4600 |
| Elongation @brk. | % | D-412 | 740 | 600 | 640 | 575 | 490 | 460 | 415 | 425 | 350 |
| Tensile set @brk. | % | D-412 | — | 45 | 70 | 75 | 65 | 70 | 60 | 90 | 80 |
| Tear strength | kN/m | D-624 | 80 | 90 | 105 | 125 | 140 | 180 | 205 | 220 | 255 |
|  | pli | DIE C | 460 | 515 | 600 | 715 | 800 | 1025 | 1170 | 1250 | 1450 |
| Abrasion resistance | mg (loss) | D-1044[2] (Taber) |  | 25 | 30 | 45 | 55 | 75 | 50 | 55 | 75 |

NOTE:
[1]Test samples were cured 20 hours @ 100° C. before testing.
[2]H-18 wheel, 1000 gmk weight and 1000 cycles.
[3]Contains proprietary plasticizer.

Elastollan™ 1100 series of products are polyether-based thermoplastic polyurethanes. They exhibit excellent low temperature properties, hydrolysis resistance and fungus resistance. These products can be injection and blow molded and extruded.

BASF indicates that Elastollan™ 1175AW, 80A, 90A and 95A are suitable for extrusion. And, Elastollan™ 1175AW to 1174D are suitable for injection molding. BASF further provides that a grade should be dried before processing. Elastollan™ can be stored for up to 1 year in its original sealed container. Containers should be stored in a cool, dry area. Elastollan™ from BASF are commercial TPU's but will not crosslink using irradiation unless a particular reactive co-agent such as Liquiflex™ H, described below, is added. Nearly any other commercially available TPU such as Urepan™, Pellethane™, Morthane™, Desmopan™, etc. can be used provided it is compounded with a co-agent that readily crosslinks with radiation.

Liquiflex™ is a commercially available hydroxyl terminated polybutadiene (HTPB), from Petroflex. It is believed that this co-agent enables the thermoplastic polyurethane to crosslink upon exposure to radiation. It is believed that the previously noted thermoplastic polyurethane EBXL-TPU from Zylon™ contains a co-agent similar to Liquiflex.

Other co-agents can also be used, as long as they will readily crosslink the TPU. Examples of other preferred co-agents include saturated reactive co-agents such as short chain dienes, unsaturated dienes, such as 1,9-decadiene and 1,7 octadiene, and unsaturated co-agents having the formula $H_2C=CH-(CH_2)_n-CH=CH_2$ where n is from 1 to 6.

As indicated above, numerous ways are known to induce crosslinking in a polymer by free radical initiation, including peroxide initiation and irradiation. The golf ball covers of the present invention preferably are crosslinked by irradiation, and more preferably light rays such as gamma or UV irradiation. Furthermore, other forms of particle irradiation, including electron beam also can be used. Gamma radiation is preferred as golf balls or game balls can be irradiated in bulk. Gamma penetrates very deep but also increases crosslinking of the inner core and the compression of the core has to be adjusted to allow for the increase in hardness.

Electron beam techniques are faster but cannot be used for treating in bulk as the electron beam does not penetrate very deep and the product needs to be rotated to obtain an even crosslink density.

The type of irradiation to be used will depend in part upon the underlying layers. For example, certain types of irradiation may degrade windings in a wound golf ball. On the other hand, balls with a solid core would not be subject to the same concerns. However, with any type of core, certain types of irradiation will tend to crosslink and thus harden the core. Depending upon whether this type of effect is sought or is to be avoided, the appropriate type of irradiation can be selected.

The level of radiation employed depends upon the desired end characteristics of the final game ball, e.g. golf ball, cover. However, generally a wide range of dosage levels may be used. For example, total dosages of up to about 12.5, or even 15 Mrads may be employed. Preferably, radiation delivery levels are controlled so that the game ball is not heated above about 80° C. (176° F.) while being crosslinked.

In one preferred form of the present invention in which the crosslinkable thermoplastic polyurethane is utilized in a cover layer of a golf ball, the golf ball has a single cover layer with a Shore D hardness of from about 35 to about 72, preferably from about 36 to about 74, and more preferably from about 38 to about 75 (uncrosslinked version). Upon cross-linking by exposure to gamma radiation as previously noted, the Shore D hardness preferably increases by at least 2 units, more preferably by 3 units, and most preferably by 5 units. This ball has a coefficient of restitution of at least 0.750, and more preferably at least 0.760, and most preferably at least 0.770. The preferred golf ball has a cover thickness of from about 0.020 inches to about 0.100 inches, and more preferably from about 0.020 inches to about 0.050 inches. A ball of this type has a PGA compression in the range of from about 40 to about 110, and more preferably from about 70 to about 90.

The Shore D hardness of the final golf ball, as measured along its outer cover, depends upon the final playing properties. A hardness in the range of from about 37 to 48 is preferred for relatively soft covers such as the Strata Tour™ golf ball produced by the present assignee of this invention. A hardness of from about 49 to about 60 is preferred for medium hardness and midspin characteristics. A hardness of from about 60 to about 77 is preferred for relatively hard covers and maximum distance properties.

It has been found that golf balls made of crosslinkable thermoplastic polyurethanes according to the present invention have excellent scuff and cut resistance. The golf balls of the invention have a scuff resistance of 1 to 3. Typically, the golf balls of the invention were found to have an excellent scuff resistance rating of 1. The test for scuff resistance which was used is described herein.

The golf balls having a crosslinkable thermoplastic polyurethane cover also were found to have an excellent cut resistance rating of 3 or better. A description of the test for measuring cut resistance is provided herein. Polyurethane when crosslinked has better cut and scuff resistance as compared to balata covers.

Shore hardnesses were measured on additional types of game balls in accordance with the present invention. Table 3, set forth below, lists preferred hardness values. Typical hardness values are plus or minus 10 points from these.

TABLE 3

|  | Shore A | Shore C | Shore D |
|---|---|---|---|
| Softballs (leather) | 90 | 68 | 45 |
| Basketballs (leather) | 80 | 40 | 30 |
| Football (leather) | 70 | 35 | 25 |
| Baseball (leather) | 85 | 65 | 42 |

Furthermore, fillers and additives can be included to provide the cover with other attributes or characteristics. Preferred fillers and amounts are set forth in Table 4.

TABLE 4

|  | Range |
|---|---|
| Titanium Dioxide | 0.50%–10% |
| Zinc Sulfite | 0.50%–10% |
| Lithopone | 0.50%–10% |
| Magnesium Carbonate | 0.50%–10% |
| Silica | 0.50%–10% |
| Clay | 0.50%–10% |
| Calcium Carbonate | 0.50%–10% |
| Blue Tint | 0.005% to 0.050% |
| Optical Brightener | 0.005% to 0.30% |

Additional components may also be added to the cover composition of the present invention. Blue tinting pigments or dyes may be added. It has been found that gamma radiation turns most, if not all, TPU's, particularly when in the form of a thin layer, from white to yellowish in color. Accordingly, it may in some instances be desirable to paint the golf ball or otherwise deposit a color coating, such as white, along the outer surface of the ball. It is to be noted however, that antioxidants may counter or offset the yellowing effect, but may also retard crosslinking.

The crosslinkable thermoplastic polyurethane cover can be used as an inner and/or outer cover layer of a multi-layer golf ball. When used as an outer cover layer, the crosslinkable thermoplastic polyurethane layer preferably exhibits hardness values as noted herein. When used as an inner cover layer, the crosslinkable thermoplastic polyurethane layer may have a hardness less than or greater than that of its corresponding outer cover layer. This combination of layers and materials may be particularly desirable for a golf ball tailored to provide relatively long distances.

When a solid core is used to form a golf ball according to the present invention, the solid core typically has a core diameter of about 1.2–1.6 inches in diameter. Conventional solid cores are typically compression or injection molded from a slug or ribbon of uncured elastomer composition comprising a high cis-content of polybutadiene and a metal salt of an alpha, beta-ethylenically unsaturated carboxylic acid such as zinc, mono or diiacrylate or methacrylate. To achieve higher coefficients of restitution in the core, the manufacturer may include fillers such as small amounts of metal oxides such as zinc oxides. In addition, larger amounts of metal oxides than those that are needed to achieve the desired coefficient are often included in conventional cores in order to increase the core weight so that the finished ball more closely approaches the U.S.G.A. upper weight limit of 1.620 ounces. Other materials may be used in the core composition according to the desired end properties, such as compatible rubbers or ionomers, and low molecular weight fatty acids such as stearic acid. Free radical initiators such as peroxides are admixed with the core composition so that on the application of heat and pressure, a complex curing crosslinking reaction takes place. Suitable polybutadiene core formulations are set forth in Table 5.

TABLE 5

| | |
|---|---|
| Polybutadiene | 100 parts by weight |
| Zinc Oxide | 3–35 parts by weight |
| Zinc Stearate | 0–20 parts by weight |
| Zinc Diacrylate | 10–50 parts by weight |
| Peroxide (40%) | 0.5 to 5.0 parts by weight |

Wound golf ball cores can be used to form the golf balls of the present invention. The inner core can be a solid or liquid sac wound to a diameter of 1.550 inches to 1.605 inches. Thread tension is adjusted to obtain a finished ball compression of typically, 40 to 110, and preferably, 70 to 90. The covers are injection or compression molded around the wound cores and finished. Gamma irradiation is preferably utilized to complete the crosslinking of the cover.

The crosslinkable thermoplastic polyurethane cover can be injection molded, compression molded or transfer molded. Preferably, injection molding, or compression molding techniques are used.

The resulting golf balls preferably exhibit the following properties as shown in Table 6.

TABLE 6

| | Typical | Preferred |
|---|---|---|
| C.O.R. | .700–.830 | .770–.820 |
| Cover thickness | 0.020"–0.100" | 0.020"–0.050" |
| PGA compression (ball) | 40–110 | 70–90 |

When the game ball is a softball, the core typically is made of a foam, or a low density material such as cork. The cover preferably is slush molded, but also can be injection molded, compression molded or cast.

Referring to the figures and first to FIG. 1, a cross section of a preferred embodiment golf ball according to the invention is shown, and is designated as 10. It will be understood that the referenced drawings are schematic in nature and are not necessarily to scale. The golf ball 10 has a dual core 12 made of polybutadiene and a single cover layer 14 formed from crosslinkable thermoplastic polyurethane. The core may be unitary solid, wound liquid or multi component as shown. In this embodiment of the invention, the thermoplastic polyurethane is not irradiation crosslinked. Thus, the core and cover have a hardness based upon their chemical composition and the curing conditions of the core.

Figure 2:
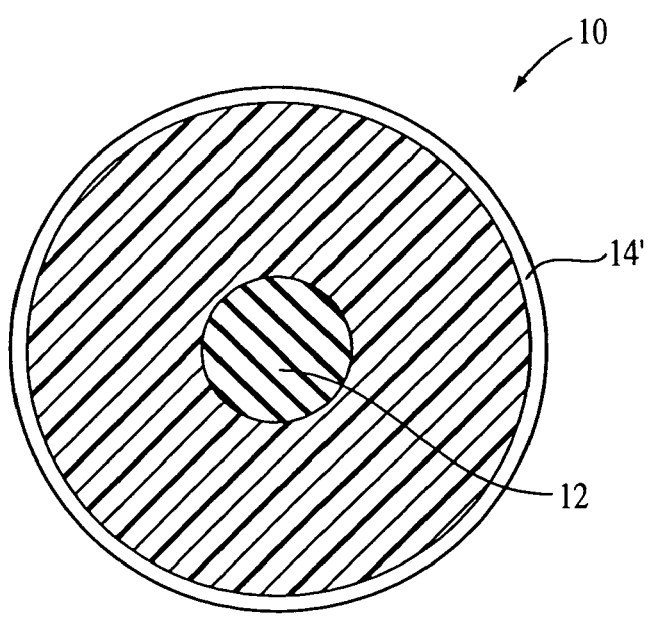
FIG. 2 is a schematic cross sectional view of a second preferred embodiment golf ball according to the present invention.

FIG. 2 illustrates a second preferred embodiment of a golf ball according to the present invention, in which the cover is irradiated with light rays, such as gamma rays or UV irradiation, preferably gamma irradiation. The gamma irradiation controls the hardness of the core and the cover and improves the durability of the cover. The degree of irradiation will depend upon the hardness of the cover prior to irradiation, and the desired result. In the preferred embodiment shown in FIG. 2, the cover 14' has a Shore D hardness of about 55 after irradiation. The dosage of radiation using one of the previously noted preferred crosslinkable thermoplastic polyurethanes is about 7 Mrads or less. However, the present invention includes the use of greater dosages of radiation.

Figure 3:
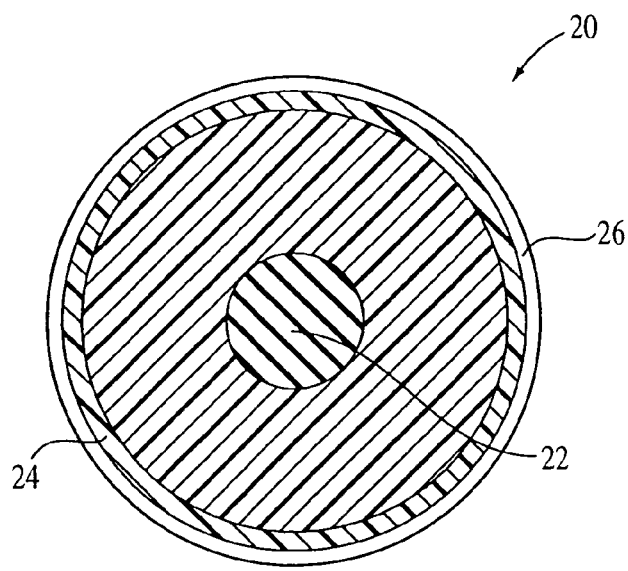
FIG. 3 is a schematic cross sectional view of a third preferred embodiment golf ball according to the present invention.

A third preferred embodiment golf ball of the present invention is shown in FIG. 3. In this embodiment, the golf ball 20 has a solid dual core 22, a hard ionomeric inner layer 24 with a Shore D hardness of at least 65, and a soft outer cover layer 26 formed from crosslinkable thermoplastic polyurethane which is not radiation crosslinked. The core may be unitary solid, wound liquid or multi component as shown. The present invention includes golf balls having other alternative layered configurations.

Figure 4:
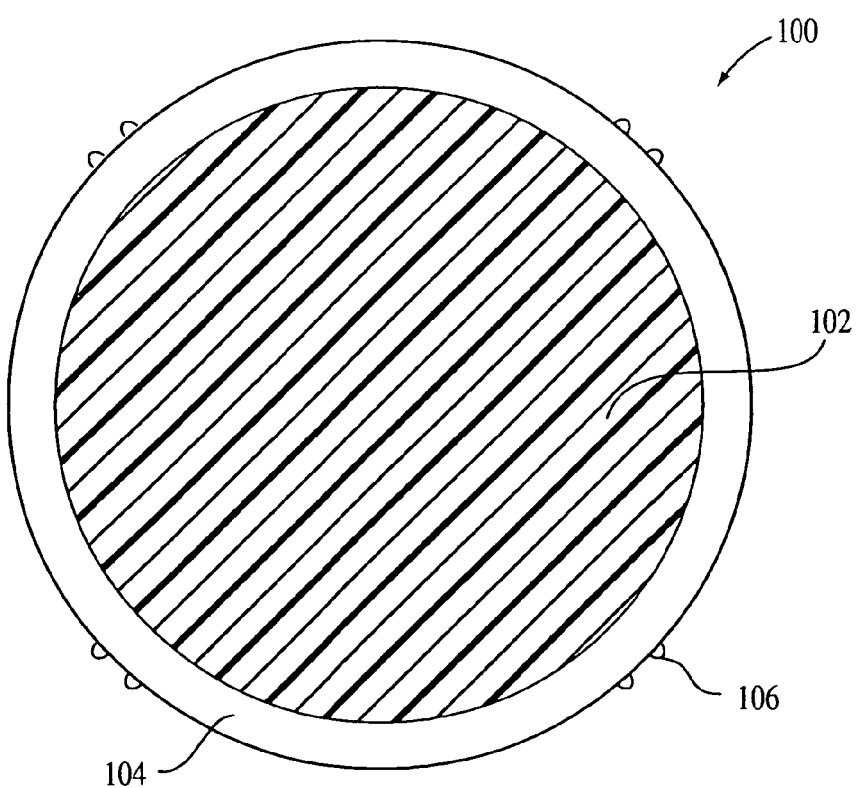
FIG. 4 is a schematic cross sectional view of a preferred embodiment softball according to the present invention.

A cross section of a fourth preferred embodiment of the present invention is shown schematically in FIG. 4. This embodiment is a softball 100 having a central cork or foam core 102 and a molded polyurethane cover 104 with simulated stitching 106. The cover 104 is formed from crosslinkable thermoplastic polyurethane which is crosslinked.

Additional components, compositions, ingredients, and processes for forming golf balls in accordance with the present invention are set forth in one or more of the following U.S. patents, assigned to the assignee of this invention: U.S. Pat. Nos. 5,833,553; 5,830,087; 5,827,548; 5,827,134; 5,820,489; 5,820,488; and 5,803,831, all of which are hereby incorporated by reference.

The thermoplastic polyurethane of the present invention is superior to conventional thermoset polyurethanes in processing in that it can be melted and reformed, and because its hardness can be readily controlled using a variety of radiation dosages. The hardness can be controlled by one or more of the following techniques. Hardness may be controlled by selecting the base TPU polymer having the desired hardness. Alternatively, or in addition, the amount of reactive co-agent (Liquiflex H or similar co-agent) may be increased or decreased. Alternatively, or in addition, hardness may be controlled by increasing or decreasing the level of radiation. Alternatively or in addition, fillers such as silica may be added to increase the hardness. The previously noted Zylon™ formulation is proprietary but it probably contains a co-agent that crosslinks with radiation.

The crosslinkable thermoplastic polyurethane cover of the invention is superior to a balata cover in that crosslinked thermoplastic polyurethanes exhibit superior cut and scuff resistance.

Having generally described the invention the following examples are included for purposes of illustration so that the invention may be more readily understood and are in no way intended to limit the scope of the invention and unless otherwise specifically indicated.

EXAMPLE 1

A core having a diameter of 1.605 inches was made from the core formulation shown below in Table 7:

TABLE 7

| Component | Parts by Weight |
| --- | --- |
| polybutadiene[1] | 70 |
| polybutadiene[2] | 30 |
| zinc oxide | 9 |
| top grade regrind | 16 |
| zinc stearate | 16 |
| zinc diacrylate | 26.5 |
| peroxide initiator | 0.9 |
| | 168.40 |

[1]Cariflex polybutadiene is available from Shell Chemical Co. of Houston, Texas.
[2]Taketene polybutadiene is available from Bayer Corp. of Akron, Ohio.

The core was cured under conditions appropriate to result in a PGA compression of 80. The core had a specific gravity of 1.127. Compression molding occurred at 320° F.

The centers were center ground to reduce them to a diameter of 1.600±0.003 inches. The cores had a weight of 38.9 grams, a Riehle compression of 80, and a coefficient of restitution of 0.808.

To form the cover, white thermoplastic polyurethane pellets of Zylon™ crosslinkable thermoplastic polyurethane EBXL-TPU-1 were used to form a golf ball cover having a thickness of about 0.04 inches. Molding was performed using an Autoject injection molding machine. The molding temperature was 360° F. The resulting balls had a diameter of 1.69 inches, a weight of 45.25 grams, a PGA compression of 79, and a coefficient of restitution of 0.772. Not all attempts of injection molding resulted in a completely covered ball.

The cover was subjected to the cut test, described above, and was found to exhibit no cutting. The cover had a Shore D hardness of 42.

EXAMPLE 2

A series of trials were conducted in which conventional thermoplastic polyurethanes were subjected to varying levels of gamma radiation. Samples of the polyurethane were molded into tensile bars. As summarized in Table 8 below, there was no change in hardness.

TABLE 8

| | Shore C | Shore D |
| --- | --- | --- |
| Morthane PS 441-300 Polyester-based | | |
| Control | 75 | 48 |
| 3.5 Mrads | 75 | 48 |
| 7.0 Mrads | 75 | 48 |
| 12.0 Mrads | 75 | 48 |
| Pellethane 2103-70A Polyether-based | | |
| Control | 40 | 25 |
| 3.5 Mrads | 40 | 25 |
| 7.0 Mrads | 40 | 25 |
| 12.0 Mrads | 40 | 25 |

Discoloration of the samples also occurred. The Morthane discolored from whitish color to a yellowish color upon exposure to 12.0 Mrads. Pellethane went from a clear yellow cast (control) to a dark yellowish orange color for the 12.0 Mrads.

EXAMPLE 3

White crosslinkable thermoplastic polyurethane pellets EBXL-TPU-1 (2% $TiO_2$) in accordance with the present invention were molded into plaques. One plaque was cut into three pieces and each piece was subjected to a different dosage of gamma irradiation. Before gamma treatment, the plaques had a Shore D hardness of 45. The results of gamma irradiation are shown below in Table 9:

TABLE 9

| Irradiation Dosage | Shore D Hardness |
| --- | --- |
| Control (No irradiation) | 45 |
| 3.5 Mrads | 53 |
| 7.0 Mrads | 55 |
| 12.0 Mrads | 60 |

While they were not formed into golf ball covers and thus were not tested for scuff resistance, it is believed that the scuff resistance of the gamma treated material is superior to that of the non-gamma treated material, due to the crosslinking into a thermoset polyurethane.

EXAMPLE 4

A series of trials were conducted by BASF in which the degree of electron beam energy input and concentration of crosslinking agent were varied to demonstrate the effects upon the physical properties of another crosslinkable thermoplastic polyurethane in accordance with the present invention, Elastollan™ 1185A-10. The results of this testing are set forth below in Table 10.

TABLE 10

| Liquiflex[3] % | Energy of Exposure kGy[1] | Tensile (DIN) Mpa | Abrasion (DIN) | ELong. % | Soft. Pt. ° C.[2] |
| --- | --- | --- | --- | --- | --- |
| 2% | -0- | 46 | 40 | 650 | 170 |
| | 45 | 43 | 47 | 700 | 180 |
| | 90 | 42 | 54 | 680 | 190 |
| | 135 | 42 | 57 | 680 | 190 |
| | 180 | 42 | 57 | 690 | 190 |

TABLE 10-continued

| Liquiflex[3] % | Energy of Exposure kGy[1] | Tensile (DIN) Mpa | Abrasion (DIN) | ELong. % | Soft. Pt. °C.[2] |
|---|---|---|---|---|---|
| 4% | -0- | 48 | 25 | 620 | 170 |
|  | 45 | 43 | 28 | 710 | 190 |
|  | 90 | 42 | 30 | 660 | 190 |
|  | 135 | 41 | 34 | 690 | 200 |
|  | 180 | 38 | 42 | 690 | 210 |
| 6% | -0- | 55 | 20 | 580 | 170 |
|  | 45 | 51 | 21 | 650 | 190 |
|  | 90 | 51 | 22 | 600 | 190 |
|  | 135 | 53 | 21 | 650 | 190 |
|  | 180 | 54 | 25 | 640 | 210 |
| 9% | -0- | 55 | 21 | 520 | 170 |
|  | 45 | 53 | 19 | 610 | 190 |
|  | 90 | 58 | 20 | 620 | 210 |
|  | 135 | 55 | 19 | 630 | 210 |
|  | 180 | 55 | 22 | 620 | 220 |
| Control % | — | 41 | 59 | 680 | 170 |

NOTE:
[1]Kgy = kilo gray of energy = 1 mega rad
[2]Soft. Pt.: This was the point at which a piece (cut from a molded plaque) began to flow out or deform when held at the listed temperature in a hot air oven for 2 hours.
[3]Liquflex H: This is a raw material which replaces the listed amount of polyol, and has a functionality of >2. It is a hydroxyl terminated polybutadiene (HTPB) produced by Petroflex.

The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

The invention claimed is:

1. A golf ball, comprising:
a core, and
a cover layer formed over said core, said cover layer comprising a crosslinkable thermoplastic polyurethane and a co-agent capable of crosslinking said crosslinkable thermoplastic polyurethane via free radical initiation, the co-agent having the formula $H_2C{=}CH{-}(CH_2)_n{-}CH{=}CH_2$ where n is from 1 to 6.

2. The golf ball according to claim 1, wherein said crosslinkable thermoplastic polyurethane has a Shore D hardness of from about 35 to about 72 before crosslinking and undergoes an increase in Shore D hardness of at least 2 units upon exposure to gamma radiation at a dosage of 3.5 Mrads.

3. The golf ball according to claim 1, wherein said crosslinkable thermoplastic polyurethane has a Shore D hardness of from about 35 to about 72 before crosslinking and experiences an increase in Shore D hardness of at least 5 units upon exposure to gamma radiation at a dosage of 3.5 Mrads.

4. The golf ball according to claim 1, wherein said crosslinkable thermoplastic polyurethane comprises at least one of a polyether based polyurethane and a polyester based polyurethane.

5. The golf ball according to claim 1, wherein said core is at least one member selected from the group consisting of solid cores, wound cores and liquid filled cores.

6. A golf ball comprising:
a core; and
a cover layer disposed about said core, said cover comprising a thermoplastic polyurethane capable of undergoing crosslinking upon exposure to about 3.5 Mrads of radiation, and thereby increasing in hardness by at least 2 units on the Shore D hardness scale, wherein said cover layer further comprises a co-agent capable of crosslinking said thermoplastic polyurethane, the a co-agent having the formula $H_2C{=}CH{-}(CH_2)_n{-}CH{=}CH_2$ where n is from 1 to 6.

7. The golf ball according to claim 6, wherein said cover layer comprises at least an inner cover layer and an outer cover layer.

* * * * *